United States Patent
Srnec et al.

(10) Patent No.: US 10,418,845 B2
(45) Date of Patent: Sep. 17, 2019

(54) METHODS AND SYSTEMS FOR AUTOMOTIVE TYPE TRANSIENT PROTECTION OF A SOLAR CHARGE SOURCE

(71) Applicant: THERMO KING CORPORATION, Minneapolis, MN (US)

(72) Inventors: Matthew Srnec, Minnetonka, MN (US); Ryan Wayne Schumacher, Bloomington, MN (US)

(73) Assignee: Thermo King Corporation, Minneapolis, MN (US)

( * ) Notice: Subject to any disclaimer, the term of this patent is extended or adjusted under 35 U.S.C. 154(b) by 105 days.

(21) Appl. No.: 15/411,109

(22) Filed: Jan. 20, 2017

(65) Prior Publication Data

US 2017/0214271 A1    Jul. 27, 2017

Related U.S. Application Data

(60) Provisional application No. 62/281,507, filed on Jan. 21, 2016.

(51) Int. Cl.
| | |
|---|---|
| *H02J 7/35* | (2006.01) |
| *H02J 7/32* | (2006.01) |
| *H02J 7/00* | (2006.01) |
| *H02J 7/14* | (2006.01) |

(52) U.S. Cl.
CPC .............. *H02J 7/35* (2013.01); *H02J 7/007* (2013.01); *H02J 7/0029* (2013.01); *H02J 7/14* (2013.01); *H02J 7/32* (2013.01)

(58) Field of Classification Search
CPC ........ H02J 7/35; H02J 7/32; H02J 7/14; H02J 7/0029; H02J 7/0071
See application file for complete search history.

(56) References Cited

U.S. PATENT DOCUMENTS

| | | | |
|---|---|---|---|
| 6,051,954 A | 4/2000 | Nagao et al. | |
| 6,545,600 B1 * | 4/2003 | Boner | B60Q 1/305 307/10.1 |
| 6,678,183 B2 * | 1/2004 | Creger | H02M 1/32 363/146 |
| 6,900,997 B2 | 5/2005 | Perreault et al. | |
| 7,105,940 B2 * | 9/2006 | Weesner | F03D 9/00 290/44 |
| 7,233,474 B2 | 6/2007 | Brown et al. | |
| 7,446,437 B2 * | 11/2008 | Paik | H02J 9/06 307/115 |
| 7,550,944 B1 | 6/2009 | Rausch | |

(Continued)

FOREIGN PATENT DOCUMENTS

WO     2010146413     12/2010

*Primary Examiner* — Naum Levin
(74) *Attorney, Agent, or Firm* — Hamre, Schumann, Mueller & Larson, P.C.

(57) ABSTRACT

Systems and methods are described herein for providing automotive type transient protection of a solar charge source. In one embodiment, a system is provided that includes a load and a solar charge source for providing DC power to the load. The solar charge source including a solar charge controller including an automotive type transient suppression module configured to provide automotive type transient protection for the solar charge source from an automotive type transient.

5 Claims, 3 Drawing Sheets

(56) References Cited

U.S. PATENT DOCUMENTS

| | | | | |
|---|---|---|---|---|
| 8,334,618 B2* | 12/2012 | Bhavaraju | H02J 3/38 | 307/86 |
| 8,531,055 B2* | 9/2013 | Adest | H04B 3/548 | 307/43 |
| 8,847,425 B2* | 9/2014 | Jordan, Sr. | F03D 9/007 | 290/55 |
| 8,866,334 B2* | 10/2014 | Donnelly | H02J 1/10 | 290/2 |
| 9,238,413 B2* | 1/2016 | Bianconi | H02J 7/0034 | |
| 9,325,173 B2* | 4/2016 | Varma | H02J 3/01 | |
| 9,441,612 B2* | 9/2016 | Haar | F03D 3/005 | |
| 9,496,751 B2* | 11/2016 | Syed | B60K 16/00 | |
| 9,780,567 B2* | 10/2017 | Hunt | H02J 5/00 | |
| 9,793,788 B2* | 10/2017 | Wagoner | H02M 3/158 | |
| 9,862,502 B2* | 1/2018 | Kim | H02J 7/34 | |
| 10,122,178 B2* | 11/2018 | Sachs | H02J 3/46 | |
| 2007/0018506 A1* | 1/2007 | Paik | H02J 9/06 | 307/115 |
| 2008/0217998 A1* | 9/2008 | Parmley | H02J 1/10 | 307/65 |
| 2009/0271336 A1* | 10/2009 | Franks | G06Q 99/00 | 705/500 |
| 2010/0175736 A1 | 7/2010 | Reichart et al. | | |
| 2010/0263947 A1 | 10/2010 | Reichart et al. | | |
| 2010/0314935 A1 | 12/2010 | Reichart et al. | | |
| 2011/0062779 A1 | 3/2011 | Reichart et al. | | |
| 2011/0068621 A1 | 3/2011 | Reichart et al. | | |
| 2011/0070816 A1 | 3/2011 | Reichart et al. | | |
| 2011/0163710 A1* | 7/2011 | Syed | B60K 16/00 | 320/101 |
| 2011/0304295 A1* | 12/2011 | McNally | H01M 10/46 | 320/101 |
| 2012/0061152 A1 | 3/2012 | Reichart et al. | | |
| 2012/0205981 A1* | 8/2012 | Varma | H02J 3/01 | 307/64 |
| 2013/0099565 A1* | 4/2013 | Sachs | H02J 3/46 | 307/25 |
| 2013/0241485 A1 | 9/2013 | Snyder | | |
| 2013/0314022 A1* | 11/2013 | Ishibashi | H02J 7/007 | 320/101 |
| 2013/0335001 A1* | 12/2013 | Bianconi | H02J 7/0034 | 320/101 |
| 2014/0015470 A1* | 1/2014 | Lim | H02J 7/35 | 320/101 |
| 2015/0177768 A1* | 6/2015 | Liang | G05F 1/67 | 307/72 |
| 2015/0300321 A1* | 10/2015 | Haar | F03D 3/005 | 206/223 |
| 2016/0111915 A1* | 4/2016 | Sellin | H02J 7/35 | 307/66 |
| 2016/0297544 A1* | 10/2016 | Kim | H02J 7/34 | |
| 2016/0380473 A1* | 12/2016 | Henningson | B60L 11/1811 | 320/101 |

* cited by examiner

METHODS AND SYSTEMS FOR AUTOMOTIVE TYPE TRANSIENT PROTECTION OF A SOLAR CHARGE SOURCE

FIELD

The disclosure herein relates to a solar charge source. More particularly, the disclosure herein relates to methods and systems for automotive type transient protection of a solar charge source.

BACKGROUND

A transport refrigeration system (TRS) is generally used to control an environmental condition (e.g., temperature, humidity, air quality, and the like) within a transport unit (e.g., a container (such as a container on a flat car, an intermodal container, etc.), a truck, a box car, or other similar transport unit (generally referred to as a "transport unit")). A refrigerated transport unit (e.g., a transport unit with a TRS) is commonly used to transport perishable items such as flowers, pharmaceuticals, produce, frozen foods, and meat products. Typically, the TRS includes a transport refrigeration unit (TRU) that is attached to the transport unit to control an environmental condition (e.g., temperature, humidity, atmosphere, etc.) of the cargo space. The TRU can include, without limitation, a compressor, a condenser, an expansion valve, an evaporator, and fans or blowers to control the heat exchange between the air inside the cargo space and the ambient air outside of the refrigerated transport unit. The TRS is typically powered by an engine as the primary power source.

SUMMARY

The disclosure herein relates to a solar charge source. More particularly, the disclosure herein relates to methods and systems for automotive type transient protection of a solar charge source.

In particular, the embodiments described herein provide systems and methods for protecting a solar charge source (e.g., a solar panel, a solar charge controller, etc.) from various electrical automotive type transients including, for example, load dump, over-current and/or over-voltage, inductive switching spike, DC motor regenerative transient, etc.

In one embodiment, a system is provided that includes a load and a solar charge source for providing DC power to the load. The solar charge source including a solar charge controller including an automotive type transient suppression module configured to provide automotive type transient protection for the solar charge source from an automotive type transient.

In another embodiment, a battery charging system for charging a battery is provided. The battery charging system includes the battery providing electrical power to a load, an electric machine charge source and a solar charge source for charging the power source. The electric machine charge source includes a prime mover configured to generate mechanical power and an electric machine connected to the prime mover and configured to convert the mechanical power generated by the prime mover into electrical power for charging the power source. The solar charge source is connected in parallel to the electric machine charge source and includes a solar panel configured to absorb sunlight and generate electrical power from the sunlight, and a solar charge controller connected to the solar panel, the solar charge controller including an automotive type transient suppression module configured to provide automotive type transient protection for the solar charge source from an automotive type transient.

In yet another embodiment, a method for providing power to a load using a solar charge source is provided. The method includes a solar charge controller of the solar charge source obtaining electrical power from a solar panel. The method also includes passing the electrical power through an electrostatic discharge protection module for protecting the solar charge source from a sudden flow of electricity between the solar charge controller and an electrically charged object. Also, the method includes a converter module converting the obtained electrical power from a first voltage level to a second voltage level. Further, the method includes a load control module regulating the converted electrical power for controlling power provided to the load. Moreover, the method includes passing the regulated electrical power through an automotive type transient suppression module for protecting the solar charge source from an automotive type transient. Also, the method includes passing the regulated electrical power through the electrostatic discharge protection module and out of the solar charge controller.

In a further embodiment, a solar charge source for providing DC power to a load is provided. The solar charge source includes a solar charge controller including an automotive type transient suppression module configured to provide automotive type transient protection for the solar charge source from an automotive type transient.

Other features and aspects will become apparent by consideration of the following detailed description and accompanying drawings.

DETAILED DESCRIPTION

The disclosure herein relates to a solar charge source. More particularly, the disclosure herein relates to methods and systems for automotive type transient protection of a solar charge source.

In particular, the embodiments described herein provide systems and methods for protecting a solar charge source (e.g., a solar panel, a solar charge controller, etc.) from an automotive type transient (also referred to as a voltage automotive type transient, an electrical automotive type transient, an automotive type transient spike, etc.) such as, for example, load dump, over-current and/or over-voltage, inductive switching spike, DC motor regenerative transient, etc. An automotive type transient as defined herein is directed to one or more of each and every transient prescribed under SAE (Society of Automotive Engineers) J1113, SAE J1455, ISO (International Standards Organization) 11452, ISO 7637, ISO 10605, and IEC (International Electrotechnical Commission) CISPR-25. In particular, an automotive type transient as defined herein can be directed to one or more of a J113/11 Pulse 1c transient, a J113/11 Pulse 2a transient, a J1113/11 Pulse 2b transient, a J113/11

Pulses 3a/3b transient, a J1113/11 Pulse 4 transient, a J1113/11 Load Dump transient.

The embodiments described herein can provide automotive type transient protection of a solar charge source from clamped and unclamped automotive type transients. Automotive type transient protection of the solar charge source can prevent temporary and/or permanent loss of the solar charge source and thereby solar charging of a battery. Automotive type transient protection of the solar charge source can also prevent temporary and/or permanent loss of any electrical components (e.g., charge sources, batteries, loads, etc.) connected to the solar charge source.

The embodiments described herein can be used to provide automotive type transient protection of a solar charge source that is connected in parallel with an electric machine charge source such as, for example, in a transport setting. For example, in one situation, an automotive type transient can occur when an electric machine charge source (e.g., a prime mover connected to an electric machine) used to control an output voltage for charging a battery is disconnected from or has an intermittent connection with the battery being charged.

The embodiments described herein can be used for a solar charge source provided in a dual energy application such as, but not limited to, a vehicle (e.g., a refrigerated transport unit, a bus, a shuttle bus, an ambulance, a boat, an airplane, a tractor, a semi-tractor, a sweeper, a dump truck, etc.), heavy machinery (industrial equipment, off-highway machinery, stand-by generator sets, pumps, oil field equipment, rail equipment, etc.), an auxiliary power unit (APU), etc. The embodiments described herein, including the solar charge source, can be rated for automotive use.

Figure 1:
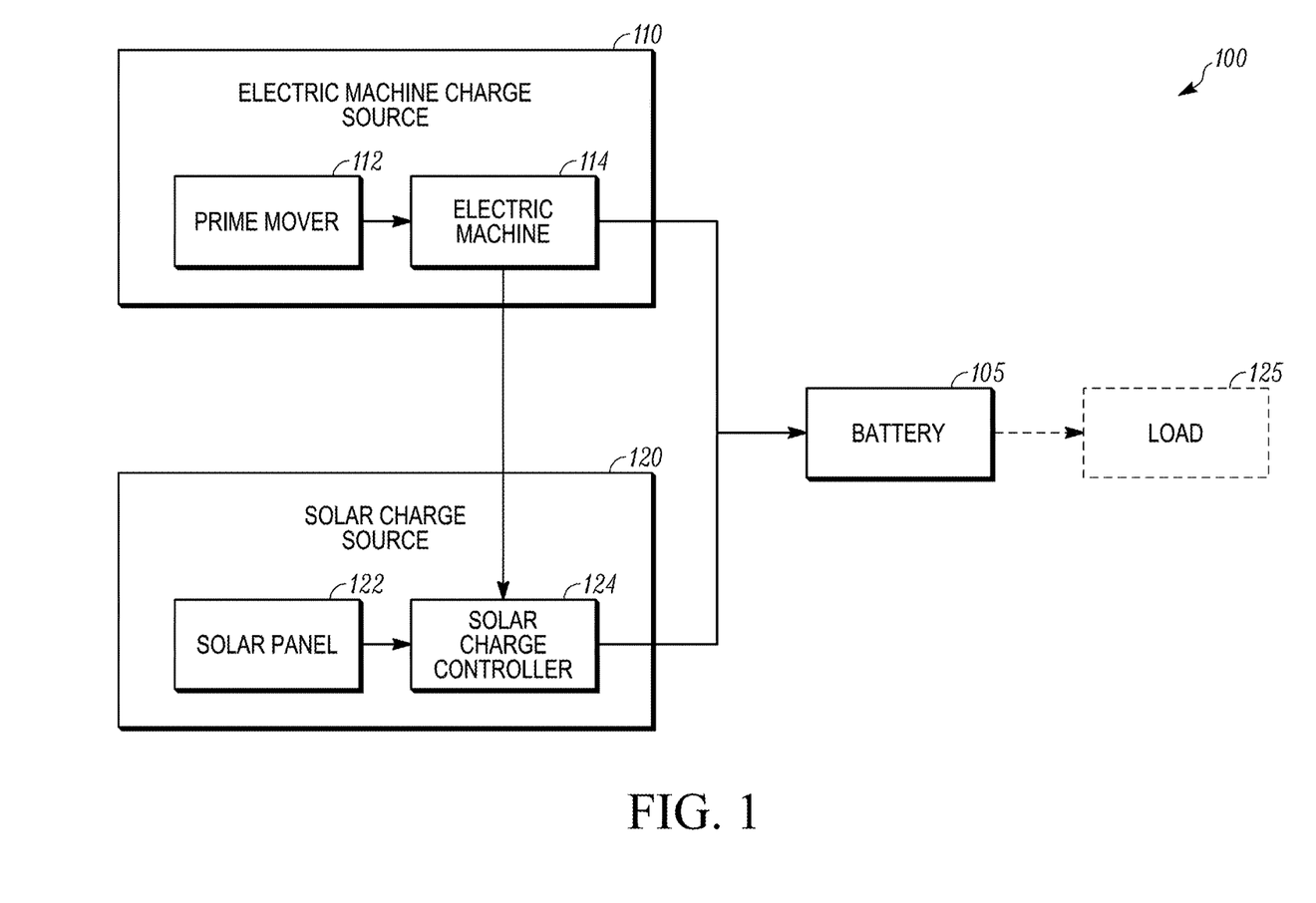
FIG. 1 illustrates a block diagram of a DC battery power system, according to one embodiment.

FIG. 1 illustrates a block diagram of a DC battery power system 100 for charging a battery 105, according to one embodiment. The DC battery power system 100 includes an electric machine charge source 110 and a solar charge source 120 for charging the battery 105 using DC power. The battery 105 can be used to power an optional load 125. In some embodiments, the DC battery power system 100 can be a 12 volt DC battery power system. In other embodiments, the DC battery power system 100 can be a higher voltage DC battery power system such as, for example, a 24 volt DC battery power system, a 48 volt DC battery power system, etc.

The electric machine charge source 110 includes a prime mover (e.g., an engine) 112 connected to an electric machine (alternator, generator, etc.) 114. The prime mover 112 is configured to generate mechanical power and send the mechanical power to the electric machine 114. The electric machine can be referred to, for example, as an electric motor, an electric generator, an electric alternator, an electromechanical energy converter, or the like and is configured to convert mechanical power into electrical power. The electric machine 114 is configured to convert the mechanical power from the prime mover 112 into electrical power before sending the electrical power to charge the battery 105. In some embodiments, the electric machine 114 can include, for example, an alternator, a generator, etc. In embodiments where the electric machine 114 includes an alternator, the electric machine 114 can include a regulator (e.g., a DC regulator) to regulate the electrical power sent to the battery 105.

The solar charge source 120 includes a solar panel 122 and a solar charge controller 124. The solar panel 122 includes one or more solar cells (not shown) that is configured to absorb sunlight from the sun and generate electrical power therefrom. As the solar panel 122 relies on the amount of light energy captured from the sun, the electrical power generated and outputted by the solar panel 122 can vary. The variable electrical power outputted by the solar panel 122 is sent to the solar charge controller 124. While FIG. 1 shows a single solar panel 122, it will be appreciated that the solar panel 122 can include a plurality of solar panels.

The solar charge controller 124 is configured to regulate the variable voltage and/or current of the electrical power received from the solar panel 122 before sending the regulated electrical power to charge the battery 105. As shown in FIG. 1, the electrical machine 114 is configured to send a run signal to the solar charge controller 124 for operating the solar charge controller 124.

In some embodiments, the electric machine charge source 110 can be the primary charge source for the battery 105 and the solar charge source 120 can be the secondary charge source. In other embodiments, the solar charge source 120 can be the primary charge source for the battery 105 and the electric machine charge source 110 can be the secondary charge source.

When charging the battery 105, the solar charge controller 124 can be configured to regulate the electrical power sent to charge the battery 105 based on the charge status of the battery 105. For example, when the battery 105 is at a low charge status, the solar charge controller can be configured to send a designated maximum electrical power to the battery 105. When the battery 105 is fully or nearly fully charged (e.g., at a high charge status), the solar charge controller can be configured to trickle charge the battery 105 (e.g., charging the battery 105 at a rate equal to a self-discharge rate of the battery 105 when the battery 105 is not providing power to the load 125). In some embodiments, the solar charge controller 124 can be configured to transition charging of the battery 105 between a bulk charge mode (e.g., delivering as much current as possible to the battery 105 to rapidly charge the battery 105), an adsorption charge mode (e.g., delivering a lower current and a steady voltage to the battery 105 to safely charge the battery 105 while preventing overheating of the battery 105) and a float charge mode (e.g., delivering an even lower current and a lower voltage to the battery 105 to prevent overcharging and outgassing the battery 105) based on the charge status of the battery 105.

The battery 105 can include one or more battery modules that can be used to provide electrical power to the optional load 125. The optional load 125 can be, for example, a vehicle (e.g., a refrigerated transport unit, a bus, a shuttle bus, an ambulance, a boat, an airplane, a tractor, a semi-tractor, a sweeper, a dump truck, etc.), heavy machinery (industrial equipment, off-highway machinery, stand-by generator sets, pumps, oil field equipment, rail equipment, etc.), an auxiliary power unit (APU), etc.

As discussed in more detail below, the DC battery power system 100 is configured to provide automotive type transient protection of the solar charge source 120 from an automotive type transient such as, for example, load dump, over-current and/or over-voltage, inductive switching spike, DC motor regenerative transient, etc. In one embodiment, the solar charge controller 124 can be configured to provide automotive type transient protection of the solar charge source 120 from an automotive type transient. Examples of automotive type transients can include, for example, SAE J1113 type transients, SAE J1455 type transients, ISO 11452 type transients, ISO 7637 type transients, ISO 10605 type transients, IEC CISPR-25 type transients, etc.

Figure 2:
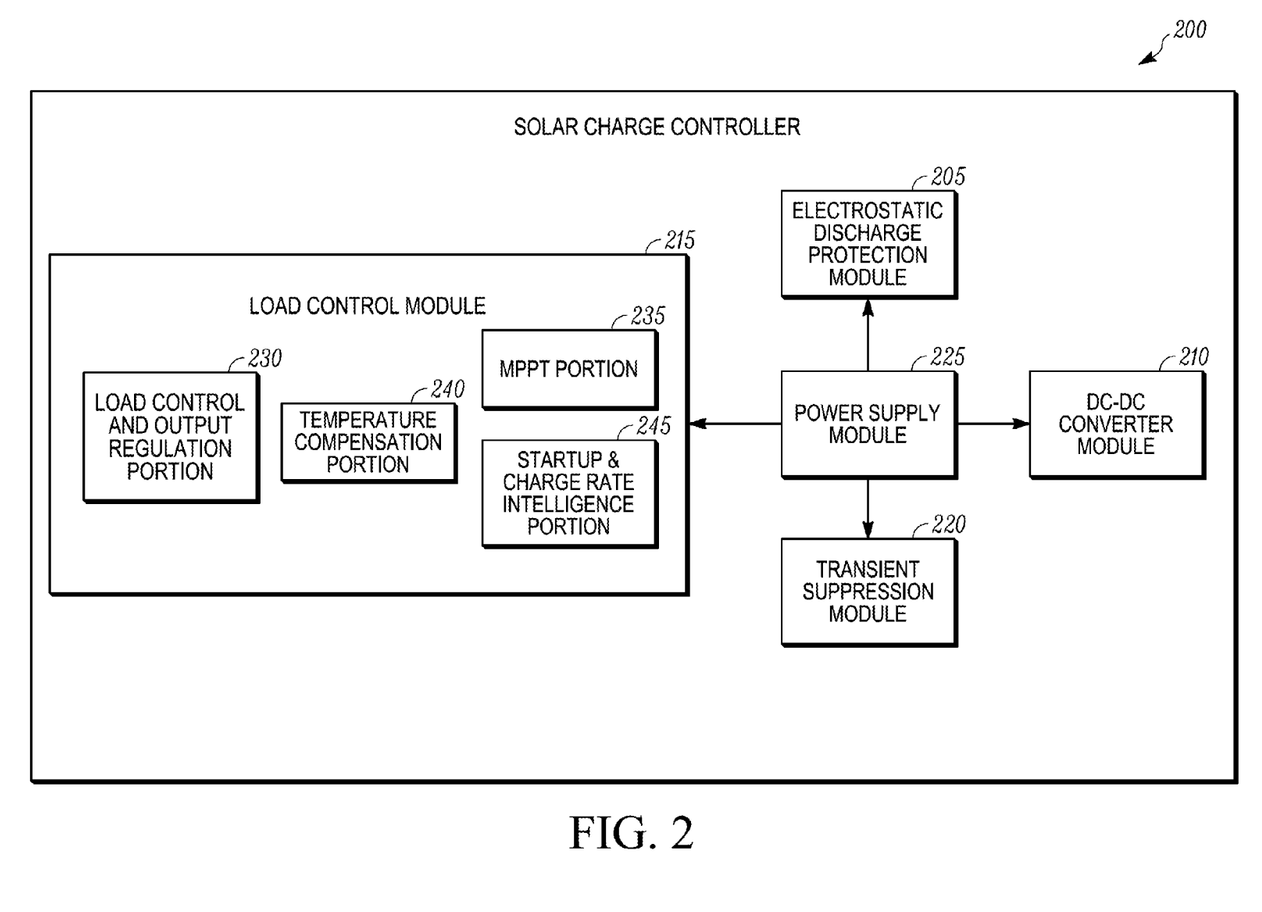
FIG. 2 illustrates a solar charge controller with automotive type transient protection, according to one embodiment.

FIG. 2 illustrates a solar charge controller 200 (such as the solar charge controller 124 shown in FIG. 1) with automotive type transient protection, according to one embodiment. The solar charge controller 200 includes an electrostatic discharge (ESD) protection module 205, a DC to DC Converter 210, a load control module 215, an automotive type transient suppression mechanism 220, and a power supply module 225. The solar charge controller 200 can also include a memory, a clock, and an input/output (I/O) interface (not shown).

The ESD protection module 205 is configured to protect the solar charge controller 200 and generally a solar charge source (e.g., the solar charge source 120 shown in FIG. 1) from a sudden flow of electricity between the solar charge controller 200 and another electrically charged object caused by, for example, contact, an electrical short, a dielectric breakdown, etc. Generally, the ESD protection module 205 can protect the solar charge source of an electrostatic discharge that can occur, for example, at a very high voltage and low power situation.

The DC-DC Converter module 210 is configured to convert electrical power from, for example, a solar panel (e.g., the solar panel 122 shown in FIG. 1) from a first voltage level to a second voltage level. The first voltage level of the electrical power from, for example, the solar panel, can be a variable voltage level dependent upon the amount of sunlight absorbed by the solar panel. The second voltage level can be a predefined voltage level that is selected based on required output electrical power of the solar charge controller 200.

The load control module 215 is configured to control operation of the solar charge controller 200 and generally the solar charge source. The load control module 215 includes a processor (not shown) having a load control and output regulation portion 230, a temperature compensation portion 235, a maximum power point tracking (MPPT) portion 240 and a startup and charge rate intelligence portion 245.

The load control and output regulation portion 230 is configured to control and regulate the electrical power sent to charge a battery (e.g., the battery 105 shown in FIG. 1) based on information received from the MPPT portion 235, the temperature compensation portion 240, and the startup and charge rate intelligence portion 245.

The MMPT portion 235 is configured to obtain solar cell data from a solar panel (e.g., the solar panel 122 shown in FIG. 1), determine power optimization information from the solar panel data, and provide the power optimization information to the load control and output regulation portion 230 in order to adjust the electrical power provided by the solar charge controller 200 to charge the battery. The power optimization information can be determined based on maximizing sunlight absorbed by the solar panel, by handling variable input of the solar panel, etc.

The temperature compensation portion 240 is configured to obtain temperature data of the battery, determine voltage and/or current correction information based on the battery temperature, and provide the voltage and/or current correction information to the load control and output regulation portion 230 in order to adjust the electrical power provided by the solar charge controller 200 to charge the battery.

The startup and charge rate intelligence portion 245 is configured to obtain charge status data from the battery, determine charge optimization information based on the charge status data, and provide the charge optimization information to the load control and output regulation portion 230 in order to adjust the electrical power provided by the solar charge controller 200 to charge the battery. For example, when the charge optimization information indicates that the battery is at a low charge status, the load control and output regulation portion 230 can be configured to send a designated maximum electrical power to the battery. When the charge optimization information indicates that the battery is fully or nearly fully charged (e.g., at a high charge status), the load control and output regulation portion 230 can be configured to trickle charge the battery (e.g., charging the battery at a rate equal to a self-discharge rate of the battery when the battery is not providing power to a load). In some embodiments, the load control and output regulation portion 230 can be configured to transition charging of the battery between a bulk charge mode (e.g., delivering as much current as possible to the battery to rapidly charge the battery), an adsorption charge mode (e.g., delivering a lower current and a steady voltage to the battery to safely charge the battery while preventing overheating of the battery) and a float charge mode (e.g., delivering an even lower current and a lower voltage to the battery to prevent overcharging and outgassing the battery) based on the charge optimization information.

The automotive type transient suppression module 220 is configured to provide automotive type transient protection for the solar charge controller 200 and generally the solar charge source. The automotive type transient suppression module 220 can provide automotive type transient protection from, for example, load dump, over-current and/or over-voltage, inductive switching spike, DC motor regenerative transient, etc. In some embodiments, the automotive type transient suppression module 220 can include a transient voltage suppression (TVS) circuit configured to react to sudden or momentary transient conditions. The TVS circuit can include an automotive transient suppression circuit for protecting the solar charge controller 200 and generally the solar charge source from an automotive type transient. Examples of automotive type transients can include, for example, SAE J1113 type transients, SAE J1455 type transients, ISO 11452 type transients, ISO 7637 type transients, ISO 10605 type transients, IEC CISPR-25 type transients, etc.

The power supply module 225 is configured to provide power to the solar charge controller 200 generally including, for example, the ESD module 205, the DC-DC converter module 210, the load control module 215 and the automotive type transient suppression module 220.

Figure 3:
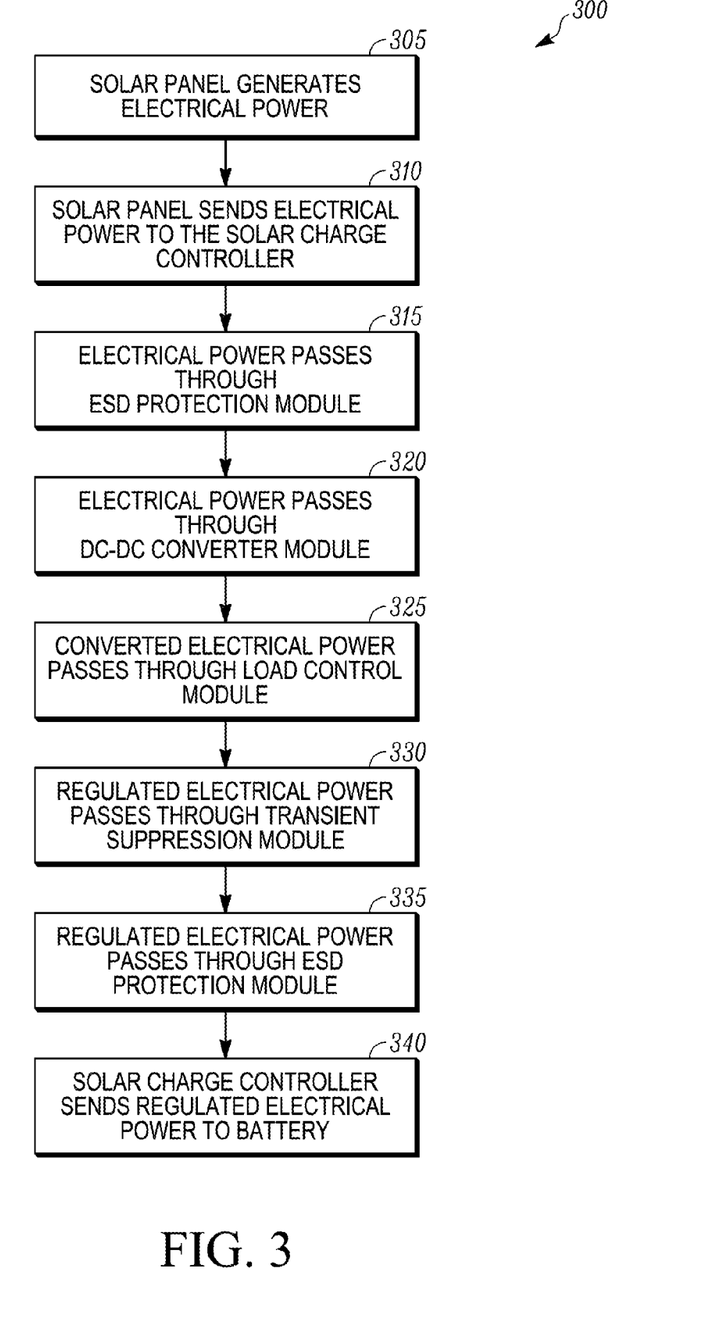
FIG. 3 illustrates a flow chart of a method for automotive type transient protection of a solar charge controller, according to one embodiment.

FIG. 3 illustrates a flow chart of a method 300 for charging a battery (e.g., the battery 105 shown in FIG. 1) using a solar charge source with automotive type transient protection (e.g., the solar charge source 120 shown in FIG. 1) that is connected in parallel with an electric machine charge source (e.g., the electric machine charge source 110 shown in FIG. 1), according to one embodiment.

At 305, a solar panel (e.g., the solar panel 122 shown in FIG. 1) absorbs sunlight and generates electrical power from the absorbed sunlight. At 310, the solar panel sends the generated electrical power to a solar charge controller (e.g., the solar charge controller 124, 200 shown in FIGS. 1 and 2). At 315, the generated electrical power passes through an ESD protection module (e.g., the ESD protection module 205 shown in FIG. 2) to protect the solar charge controller and generally the solar charge source from a sudden flow of electricity between the solar charge controller 200 and another electrically charged object caused by, for example, contact, an electrical short, a dielectric breakdown, etc.

At 320, the electrical power passing through the ESD protection module then passes through a DC-DC converter module (e.g., the DC-DC converter module 210 shown in FIG. 2) to convert the electrical power from a first voltage level to a second voltage level. The first voltage level of the electrical power from the solar panel can be, for example, a variable voltage level dependent upon the amount of sunlight absorbed by the solar panel. The second voltage level can be a predefined voltage level that is selected based on required output electrical power of the solar charge controller.

At 330, the converted electrical power from the DC-DC converter module then passes through a load control module (e.g., the load control module 215 shown in FIG. 2) to regulate the converted electrical power. The load control module can regulate the converted electrical power based on, for example, temperature compensation, MPPT, startup and charge rate intelligence, etc. as discussed above with respect to the load control module 215 shown in FIG. 2.

At 335, the regulated electrical power from the load control module then passes through an automotive type transient suppression module (e.g., the automotive type transient suppression module 220 shown in FIG. 2) to provide automotive type transient protection for the solar charge controller and generally the solar charge source. The automotive type transient suppression module can provide automotive type transient protection from, for example, load dump, over-current and/or over-voltage, inductive switching spike, DC motor regenerative transient, etc. In some embodiments, the regulated electrical power passes through a TVS circuit configured to react to sudden or momentary transient conditions. The TVS circuit can include an automotive type transient suppression circuit for protecting the solar charge controller and generally the solar charge source from an automotive type transient. Examples of automotive type transients can include, for example, SAE J1113 type transients, SAE J1455 type transients, ISO 11452 type transients, ISO 7637 type transients, ISO 10605 type transients, IEC CISPR-25 type transients, etc.

At 340, the solar charge controller sends the regulated electrical power to the battery for charging the battery.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

Aspects

Any of aspects 1-6 can be combined with any of aspects 7-10 and aspects 11-15. Any aspects 7-10 can be combined with any of aspects 11-15.

Aspect 1. A system comprising:
 a load;
 a solar charge source for providing DC power to the load, the solar charge source including:
  a solar charge controller including an automotive type transient suppression module configured to provide automotive type transient protection for the solar charge source from an automotive type transient.

Aspect 2. The system of aspect 1, wherein the solar charge source further includes a solar panel connected to the solar charge controller, wherein the solar panel is configured to absorb sunlight and generate electrical power from the sunlight.

Aspect 3. The system of any one of aspects 1 or 2, wherein the solar charge controller further includes a load control module configured to control operation of the solar charge source.

Aspect 4. The system of aspect 3, wherein the load control module includes:
 a maximum power point tracking (MPPT) portion configured to obtain solar cell data from a solar panel and determine power optimization information from the solar panel data;
 a temperature compensation portion configured to obtain temperature data of the load and determine correction information based on the temperature data; and
 a startup and charge rate intelligence portion configured to obtain charge status data from the load and determine charge optimization information based on the charge status data; and
 a load control and output regulation portion configured to control and regulate electrical power sent to charge the load based on the power optimization information obtained from the MPPT portion, the correction information obtained from the temperature compensation portion, and the charge optimization information obtained from the startup and charge rate intelligence portion.

Aspect 5. The system of any one of aspects 1-4, wherein the automotive type transient suppression module is configured to protect the solar charge source from one or more of a SAE J1113 type transient, a SAE J1455 type transient, a ISO 11452 type transient, a ISO 7637 type transient, a ISO 10605 type transient, and a IEC CISPR-25 type transient.

Aspect 6. The system of aspect 5, wherein the automotive type transient suppression module is configured to protect the solar charge source from one or more of a J1113/11 Pulse 1c transient, a J1113/11 Pulse 2a transient, a J1113/11 Pulse 2b transient, a J113/11 Pulses 3a/3b transient, a J1113/11 Pulse 4 transient, a J1113/11 Load Dump transient.

Aspect 7. The system of any one of aspects 1-6, wherein the load is a power source for providing electrical power.

Aspect 8. The system of any one of aspects 1-7, further comprising an electric machine charge source for providing DC power to the load, the electric machine charge source including an electric machine;
 wherein the electric machine charge source and the solar charge source are connected in parallel to the load.

Aspect 9. The system of any one of aspects 1-8, wherein the solar charge controller includes an electrostatic discharge protection module configured to protect the solar charge source from a sudden flow of electricity between the solar charge controller and an electrically charged object.

Aspect 10. A battery charging system for charging a battery comprising:
 the battery providing electrical power to a load;
 an electric machine charge source for charging the power source, the electric machine charge source including a prime mover configured to generate mechanical power and an electric machine connected to the prime mover and configured to convert the mechanical power generated by the prime mover into electrical power for charging the power source; and
 a solar charge source for charging the power source, wherein the solar charge source is connected in parallel to the electric machine charge source, the solar charge source including:
  a solar panel configured to absorb sunlight and generate electrical power from the sunlight, and
  a solar charge controller connected to the solar panel, the solar charge controller including an automotive type transient suppression module configured to provide automotive type transient protection for the solar charge source from an automotive type transient.

Aspect 11. The battery charging system of aspect 10, wherein the solar charge controller further includes a load control module configured to control operation of the solar charge source.

Aspect 12. The battery charging system of aspect 11, wherein the load control module includes:
 a maximum power point tracking (MPPT) portion configured to obtain solar cell data from the solar panel and determine power optimization information from the solar panel data;
 a temperature compensation portion configured to obtain temperature data of the battery and determine correction information based on the temperature data; and
 a startup and charge rate intelligence portion configured to obtain charge status data from the battery and determine charge optimization information based on the charge status data; and
 a load control and output regulation portion configured to control and regulate electrical power sent to charge the battery based on the power optimization information obtained from the MPPT portion, the correction information obtained from the temperature compensation portion, and the charge optimization information obtained from the startup and charge rate intelligence portion.

Aspect 13. The battery charging system of any one of aspects 10-12, wherein the automotive type transient suppression module is configured to protect the solar charge source from one or more of a SAE J1113 type transient, a SAE J1455 type transient, a ISO 11452 type transient, a ISO 7637 type transient, a ISO 10605 type transient, and a IEC CISPR-25 type transient.

Aspect 14. The battery charging system of aspect 13, wherein the automotive type transient suppression module is configured to protect the solar charge source from one or more of a J1113/11 Pulse 1c transient, a J1113/11 Pulse 2a transient, a J1113/11 Pulse 2b transient, a J1113/11 Pulses 3a/3b transient, a J1113/11 Pulse 4 transient, a J1113/11 Load Dump transient.

Aspect 15. The battery charging system of any one of aspects 10-14, wherein the solar charge controller includes an electrostatic discharge protection module configured to protect the solar charge source from a sudden flow of electricity between the solar charge controller and an electrically charged object.

Aspect 16. The battery charging system of any one of aspects 10-15, wherein the automotive type transient suppression module is configured to provide automotive type transient protection for the solar charge source from then automotive type transient occurring when the electric machine charge source is disconnected from the battery.

Aspect 17. A method for providing power to a load using a solar charge source, the method comprising:
 a solar charge controller of the solar charge source obtaining electrical power from a solar panel;
 passing the electrical power through an electrostatic discharge protection module for protecting the solar charge source from a sudden flow of electricity between the solar charge controller and an electrically charged object;
 a converter module converting the obtained electrical power from a first voltage level to a second voltage level;
 a load control module regulating the converted electrical power for controlling power provided to the load;
 passing the regulated electrical power through an automotive type transient suppression module for protecting the solar charge source from an automotive type transient; and
 passing the regulated electrical power through the electrostatic discharge protection module and out of the solar charge controller.

Aspect 18. The method of aspect 17, further comprising sending the regulated electrical power to the load.

Aspect 19. The method of any one of aspects 17 or 18, wherein the load control module regulating the converted electrical power for controlling power provided to the load includes:
 a maximum power point tracking portion determining power optimization information based on solar cell data from a solar panel;
 a temperature compensation portion determining correction information based on temperature data of the power source;
 a startup and charge rate intelligence portion determining charge optimization information based on charge status data of the power source; and
 the load control module regulating the converted electrical power based on the power optimization information, the correction information, and the charge optimization information.

Aspect 21. The method of any one of aspects 17-20, further comprising the automotive type transient suppression module protecting the solar charge source from one or more of a SAE J1113 type transient, a SAE J1455 type transient, a ISO 11452 type transient, a ISO 7637 type transient, a ISO 10605 type transient, and a IEC CISPR-25 type transient.

Aspect 22. The method of aspect 21, further comprising the automotive type transient suppression module protecting the solar charge source from one or more of a J1113/11 Pulse 1c transient, a J1113/11 Pulse 2a transient, a J1113/11 Pulse 2b transient, a J1113/11 Pulses 3a/3b transient, a J1113/11 Pulse 4 transient, a J1113/11 Load Dump transient.

Aspect 23. A solar charge source for providing DC power to a load, the solar charge source comprising:
 a solar charge controller including an automotive type transient suppression module configured to provide automotive type transient protection for the solar charge source from an automotive type transient.

Aspect 24. The solar charge source of aspect 23, further comprising a solar panel connected to the solar charge controller, wherein the solar panel is configured to absorb sunlight and generate electrical power from the sunlight.

Aspect 25. The solar charge source of any one of aspects 23 or 24, wherein the solar charge controller further includes a load control module configured to control operation of the solar charge source.

Aspect 26. The solar charge source of aspect 25, wherein the load control module includes:
 a maximum power point tracking (MPPT) portion configured to obtain solar cell data from a solar panel and determine power optimization information from the solar panel data;
 a temperature compensation portion configured to obtain temperature data of the load and determine correction information based on the temperature data; and
 a startup and charge rate intelligence portion configured to obtain charge status data from the load and determine charge optimization information based on the charge status data; and
 a load control and output regulation portion configured to control and regulate electrical power sent to charge the load based on the power optimization information obtained from the MPPT portion, the correction information obtained from the temperature compensation portion, and the charge optimization information obtained from the startup and charge rate intelligence portion.

Aspect 27. The solar charge source of any one of aspects 23-26, wherein the automotive type transient suppression module is configured to protect the solar charge source from one or more of a SAE J1113 type transient, a SAE J1455 type transient, a ISO 11452 type transient, a ISO 7637 type transient, a ISO 10605 type transient, and a IEC CISPR-25 type transient.

Aspect 28. The solar charge source of aspect 27, wherein the automotive type transient suppression module is configured to protect the solar charge source from one or more of a J1113/11 Pulse 1c transient, a J1113/11 Pulse 2a transient, a J1113/11 Pulse 2b transient, a J1113/11 Pulses 3a/3b transient, a J1113/11 Pulse 4 transient, a J1113/11 Load Dump transient.

Aspect 29. The solar charge source of any one of aspects 23-28, wherein the solar charge controller includes an electrostatic discharge protection module configured to protect the solar charge source from a sudden flow of electricity between the solar charge controller and an electrically charged object.

What is claimed is:

1. A battery charging system for charging a battery comprising:
   the battery providing electrical power to a load;
   an electric machine charge source for charging the battery, the electric machine charge source including a prime mover configured to generate mechanical power and an electric machine connected to the prime mover and configured to convert the mechanical power generated by the prime mover into electrical power for charging the power source; and
   a solar charge source for charging the battery, wherein the solar charge source is connected in parallel to the electric machine charge source, the solar charge source including:
      a solar panel configured to absorb sunlight and generate electrical power from the sunlight, and
      a solar charge controller connected to the solar panel, the solar charge controller including an automotive type transient suppression module configured to provide automotive type transient protection for the solar charge source from an automotive type transient,
   wherein the solar charge controller further includes:
      a maximum power point tracking (MDPT) portion configured to obtain solar cell data from the solar panel and determine power optimization information from the solar panel data;
      a temperature compensation portion configured to obtain temperature data of the battery and determine correction information based on the temperature data; and
      a startup and charge rate intelligence portion configured to obtain charge status data from the battery and determine charge optimization information based on the charge status data; and
      a load control and output regulation portion configured to control and regulate electrical power sent to charge the battery based on the power optimization information obtained from the MPPT portion, the correction information obtained from the temperature compensation portion, and the charge optimization information obtained from the startup and charge rate intelligence portion.

2. The battery charging system of claim 1, wherein the automotive type transient suppression module is configured to protect the solar charge source from one or more of a SAE J1113 type transient, a SAE J1455 type transient, a ISO 11452 type transient, a ISO 7637 type transient, a ISO 10605 type transient, and a IEC CISPR-25 type transient.

3. The battery charging system of claim 2, wherein the automotive type transient suppression module is configured to protect the solar charge source from one or more of a J1113/11 Pulse 1c transient, a J1113/11 Pulse 2a transient, a J1113/11 Pulse 2b transient, a J1113/11 Pulses 3a/3b transient, a J1113/11 Pulse 4 transient, a J1113/11 Load Dump transient.

4. The battery charging system of claim 1, wherein the solar charge controller includes an electrostatic discharge protection module configured to protect the solar charge source from a sudden flow of electricity between the solar charge controller and an electrically charged object.

5. The battery charging system of claim 1, wherein the automotive type transient suppression module is configured to provide automotive type transient protection for the solar charge source from the automotive type transient occurring when the electric machine charge source is disconnected from the battery.

* * * * *